(12) United States Patent
Kim et al.

(10) Patent No.: US 8,040,481 B2
(45) Date of Patent: Oct. 18, 2011

(54) IN-PLANE SWITCHING MODE LIQUID CRYSTAL DISPLAY DEVICE HAVING FIRST AND SECOND COMMON ELECTRODE CONNECTION LINES AND FIRST AND SECOND PIXEL ELECTRODE CONNECTION LINESBEING FORMED ON THE SAME LAYER

(75) Inventors: Do-Sung Kim, Gyeongsangbuk-Do (KR); Woon-Sub Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/758,564

(22) Filed: Apr. 12, 2010

(65) Prior Publication Data

US 2010/0195010 A1    Aug. 5, 2010

Related U.S. Application Data

(62) Division of application No. 11/168,572, filed on Jun. 29, 2005, now Pat. No. 7,724,336.

(30) Foreign Application Priority Data

Jun. 29, 2004 (KR) .................................. 2004-49777

(51) Int. Cl.
*G02F 1/1343* (2006.01)
(52) U.S. Cl. ..................... 349/141; 349/38; 349/144
(58) Field of Classification Search .............. 49/141; 349/38, 141, 144
See application file for complete search history.

(56) References Cited

U.S. PATENT DOCUMENTS

| | | | |
|---|---|---|---|
| 6,459,464 B1 * | 10/2002 | Nakasima et al. | 349/141 |
| 2002/0021396 A1 * | 2/2002 | Yoo et al. | 349/141 |
| 2002/0126241 A1 * | 9/2002 | Kurahashi et al. | 349/114 |
| 2002/0163604 A1 * | 11/2002 | Kim et al. | 349/43 |
| 2003/0043329 A1 * | 3/2003 | Park | 349/141 |
| 2004/0109121 A1 * | 6/2004 | Cho et al. | 349/141 |

FOREIGN PATENT DOCUMENTS

| | | | |
|---|---|---|---|
| KR | 1020020080860 | | 10/2002 |
| KR | 1020020081133 | | 10/2002 |
| KR | 1020030082375 | | 10/2003 |
| KR | 10-20040031341 | * | 4/2004 |
| KR | 1020040031341 | | 4/2004 |

OTHER PUBLICATIONS

Communication from Korean Patent Office dated Feb. 28, 2006.

* cited by examiner

*Primary Examiner* — Lauren Nguyen
(74) *Attorney, Agent, or Firm* — McKenna Long & Aldridge LLP

(57) ABSTRACT

An in-plane switching mode liquid crystal display device includes a first substrate; a gate line disposed in a first direction on the first substrate; a data line disposed in a second direction on the first substrate, the data line crossing the gate line to define a pixel region; pixel electrodes and common electrodes disposed in the first direction in the pixel region, the pixel electrodes and the common electrodes generating an in-plane electric field within the pixel region; first and second common lines disposed parallel to the data line at right and left sides of the pixel region; a first common electrode connection line connecting at least two common electrodes and forming a first common electrode overlapping region by overlapping the first common line; and a second common electrode connection line connecting at least two other common electrodes and forming a second common electrode overlapping region by overlapping the second common line, wherein the first common electrode overlapping region and the second common electrode overlapping region have substantially the same area.

27 Claims, 12 Drawing Sheets

IN-PLANE SWITCHING MODE LIQUID CRYSTAL DISPLAY DEVICE HAVING FIRST AND SECOND COMMON ELECTRODE CONNECTION LINES AND FIRST AND SECOND PIXEL ELECTRODE CONNECTION LINESBEING FORMED ON THE SAME LAYER

CROSS-REFERENCE TO RELATED APPLICATIONS

This application is a Divisional of application Ser. No. 11/168,572 filed Jun. 29, 2005 now U.S. Pat. No. 7,724,336, which claims priority to Korean Patent Application No. 10-2004-0049777, filed Jun. 29, 2004, all of which are hereby incorporated by reference for all purposes as if fully set forth herein.

BACKGROUND OF THE INVENTION

1. Field of the Invention

The present invention relates to a liquid crystal display device and more particularly, to an in-plane switching mode liquid crystal display device and a method for fabricating the same.

2. Description of the Related Art

A liquid crystal display (LCD) device is commonly used as a flat panel display device because it provides high quality images and consumes low power. The LCD device is formed by attaching face to face a thin film transistor array substrate and a color filter substrate with a uniform gap between the two substrates, and forming a liquid crystal layer between the two substrates. Pixels are arranged on the thin film transistor array substrate in a matrix. A thin film transistor, a pixel electrode and a capacitor are formed in each pixel region. A common electrode, an RGB color filter, and a black matrix are formed on the color filter substrate. An electric field is generated between the common electrode and the pixel electrode and applied to the liquid crystal layer. The RGB color filter implements colors.

Alignment films are formed at facing surfaces of the thin film transistor array substrate and the color filter substrate. The alignment films are rubbed to arrange the liquid crystal layer in a specific direction. Liquid crystals rotate due to a dielectric anisotropy when the electric field is applied to the liquid crystal layer between the pixel electrode formed in each pixel region and the common electrode formed on the entire surface of the color filter substrate. The rotation of the liquid crystals causes individual pixel regions to transmit or block light for displaying letters or images.

However, such a twisted nematic mode LCD device has a narrow viewing angle. Therefore, research is actively ongoing in developing an in-plane switching (IPS) mode LCD device to solve the viewing angle problem. In an IPS mode LCD device, liquid crystal molecules are aligned nearly parallel to a substrate.

FIG. 1A is a plane view of a pixel region of the related art IPS-LCD device. FIG. 1B is a cross-sectional view taken along line I-I' of FIG. 1A. Referring to FIGS. 1A and 1B, a gate line 1 and a data line 3 are arranged horizontally and vertically on a transparent first substrate 10 to define a pixel region. Although N gate lines 1 and M data lines 3 cross each other to define N×M pixels in an actual LCD device, only one pixel is illustrated in the drawing to simplify the description.

A thin film transistor 9, including a gate electrode 1a, a semiconductor layer 5 and source/drain electrodes 2a and 2b, is disposed at the crossing of the gate line 1 and the data line 3, and the gate electrode 1a and the source/drain electrodes 2a and 2b are respectively electrically connected to the gate line 1 and the data line 3. A common line 4 is arranged parallel to the gate line 1 within the pixel region, and at least one pair of electrodes switching liquid crystal molecules, namely, a common electrode 6 and a pixel electrode 7 are arranged parallel to the data line. The common electrode 6 is formed simultaneously with the gate line 1 and electrically connected to the common line 4. A gate insulation layer 8 is formed over an entire substrate 10 including the common electrode 6. The pixel electrode 7 is formed on the insulation layer 8 simultaneously with the source/drain electrodes 2a/2b and electrically connected to the drain electrode 2b of the thin film transistor 9. A passivation film 11 is formed over the entire substrate including the source/drain electrodes 2a and 2b. A pixel electrode line 14 overlapping the common line 4 and electrically connected to the pixel electrode 7 forms a storage capacitance (Cst) with the insulation film 8 interposed between the common line 4 and the pixel electrode line 14.

A black matrix 21 for preventing light leakage to the thin film transistor 9, the gate line 1 and the data line 3, and a color filter 23 are formed on a second substrate 20, and an overcoat film (not shown) is applied on the color filter 23 to flatten the color filter 23. Alignment films 12a and 12b are applied to facing surfaces of the first substrate 10 and the second substrate 20. The alignment films 12a and 12b determine an initial alignment direction of the liquid crystals. A liquid crystal layer 13 is formed between the first substrate 10 and the second substrate 20 in order to control transmittance of light by a voltage applied to the common electrode 6 and the pixel electrode 7.

The related art IPS-LCD device having the above-described structure improves viewing angle because the common electrode 6 and the pixel electrode 7 are placed on the same substrate and generate an in-plane electric field. However, the IPS-LCD device has the following problems. Because the common electrode 6 and the pixel electrode 7, which is formed of an opaque metal, are placed within the pixel region where an image is displayed, and brightness degraded.

Furthermore, an in-plane electric field is not normally formed within the pixel region because of signal interference between the data line 3 and the pixel electrode 7. The aperture is reduced when the width of the common electrode 6 adjacent to the data line 3 is increased to prevent signal interference between the data line 3 and the pixel electrode 7. Specifically, a data signal supplied to the data line 3 may affect the pixel electrode 7 adjacent to the data line 3, which causes a distortion of the electric field. Particularly, if the pixel electrode 7 is formed parallel to the data line 3 as shown in FIG. 1A, the data line 3 causes strong signal interference with the pixel electrode 7. To shield the signal interference from the data line 3, a width of the outermost common electrode 6 adjacent to the data line 3 is increased. Accordingly, the aperture ratio is reduced.

SUMMARY OF THE INVENTION

Accordingly, the present invention is directed to an in-plane switching mode liquid crystal display device and a method for fabricating the same that substantially obviate one or more of the problems due to limitations and disadvantages of the related art.

An object of the present invention is to provide an in-plane switching mode liquid crystal display device and a method for fabricating the same that improve an aperture ratio of the liquid crystal display device.

Another object of the present invention is to provide an in-plane switching mode liquid crystal display device and a method for fabricating the same capable of improving image quality.

Another object of the present invention is to minimize a signal interference in an in-plane switching mode liquid crystal display device Another object of the present invention is to provide a method for fabricating an in-plane switching mode liquid crystal display device with a reduction in a signal interference.

To achieve these and other advantages and in accordance with the purpose of the present invention, as embodied and broadly described herein, an in-plane switching mode liquid crystal display device includes a first substrate; a gate line disposed in a first direction on the first substrate; a data line disposed in a second direction on the first substrate, the data line crossing the gate line to define a pixel region; pixel electrodes and common electrodes disposed in the first direction in the pixel region, the pixel electrodes and the common electrodes generating an in-plane electric field within the pixel region; first and second common lines disposed parallel to the data line at right and left sides of the pixel region; a first common electrode connection line connecting at least two common electrodes and forming a first common electrode overlapping region by overlapping the first common line; and a second common electrode connection line connecting at least two other common electrodes and forming a second common electrode overlapping region by overlapping the second common line, wherein the first common electrode overlapping region and the second common electrode overlapping region have substantially the same area.

In another aspect, an in-plane switching mode liquid crystal display device includes a first substrate; a gate line disposed in a first direction on the first substrate; a data line disposed in a second direction on the first substrate, the data line crossing the gate line to define a pixel region, including a first pixel region and a second pixel region; one or more first pixel electrode and one or more first common electrode inclined with respect to the first direction and generating a first in-plane electric field within the first region; one or more second pixel electrode and one or more second common electrode inclined with respect to the first direction and generating a second in-plane electric field within the second region symmetrically to the first in-plane electric field with respect to the first direction; first and second common lines parallel to the data line at left and right sides of the pixel region, respectively; a first common electrode connection line overlapping the first common line of the first region and connecting at least two first common electrodes; a second common electrode connection line overlapping the second common line of the second region and connecting at least two second common electrodes; a first pixel electrode connection line overlapping the second common line of the first region and connecting at least two first pixel electrodes; and a second pixel electrode connection line overlapping the first common line of the second region and connecting at least two second pixel electrodes; wherein a first common electrode overlapping region of the first common line and the first common electrode connection line and a second common electrode overlapping region of the second common line and the second common electrode connection line have the same area, and a first pixel electrode overlapping region of the second common line and the first pixel electrode connection line and a second pixel electrode overlapping region of the first common line and the second pixel electrode connection line have the same area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
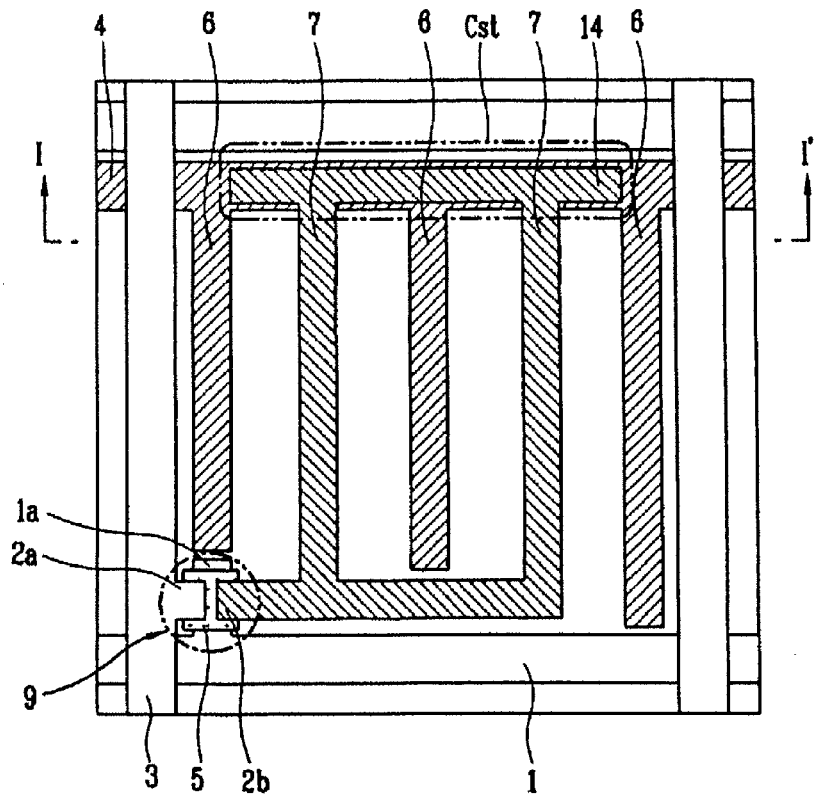
FIG. 1A is a plane view of a pixel region of a related art IPS-LCD device.
Figure 1B:
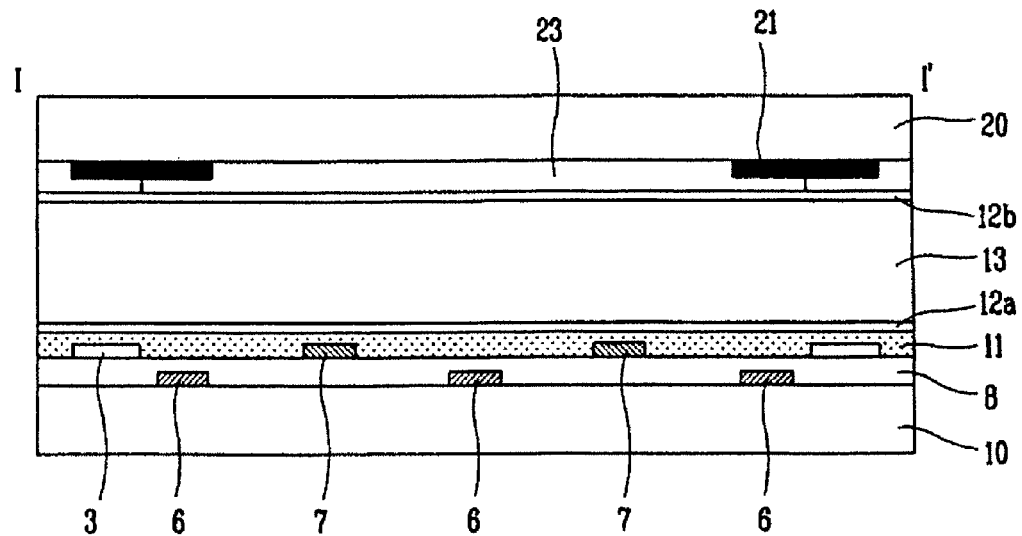
FIG. 1B is a cross-sectional view taken along line I-I' of FIG. 1A.
Figure 2A:
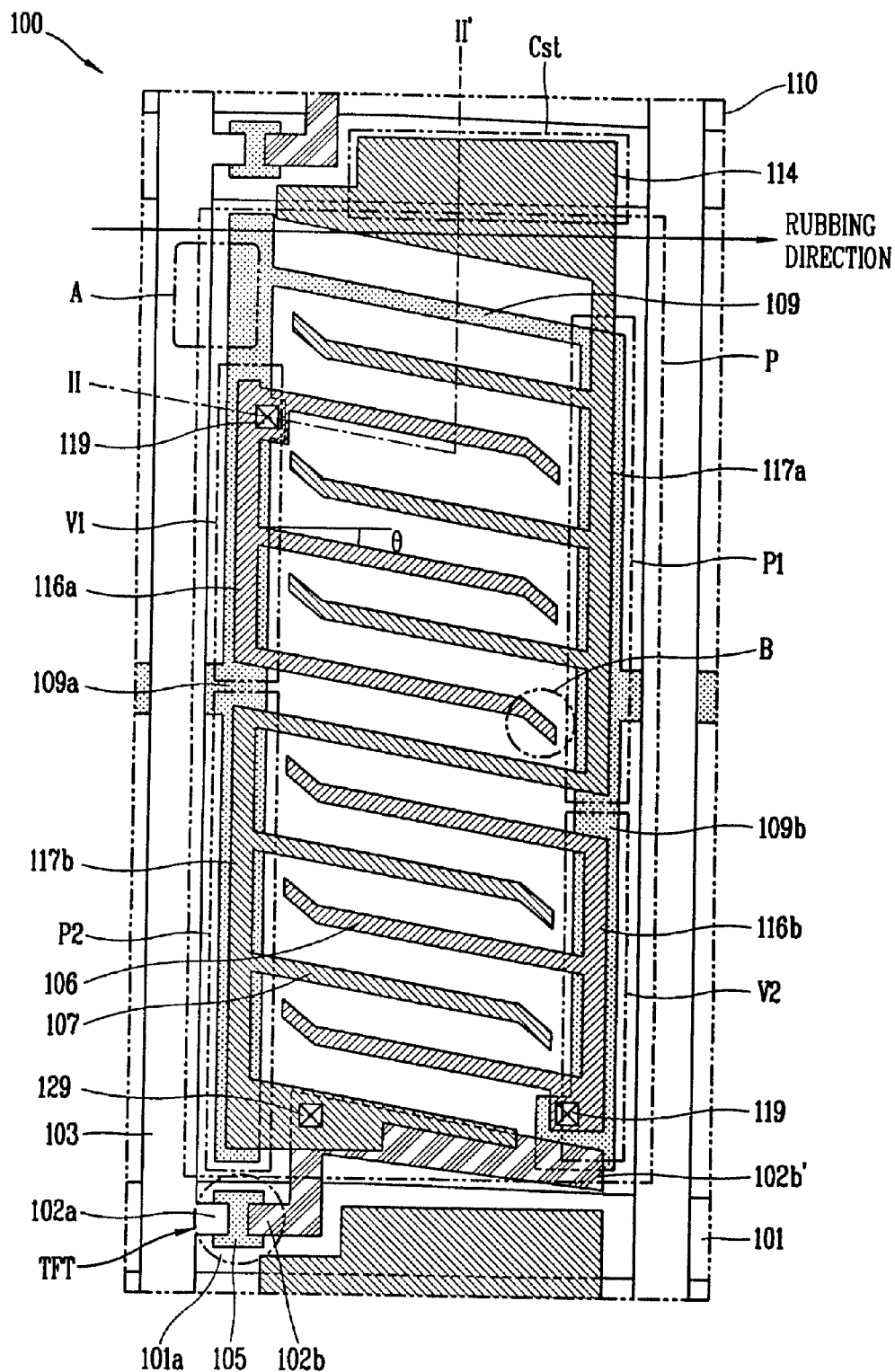
FIG. 2A is a plane view of an exemplary pixel region according to an embodiment of the present invention.
Figure 2B:
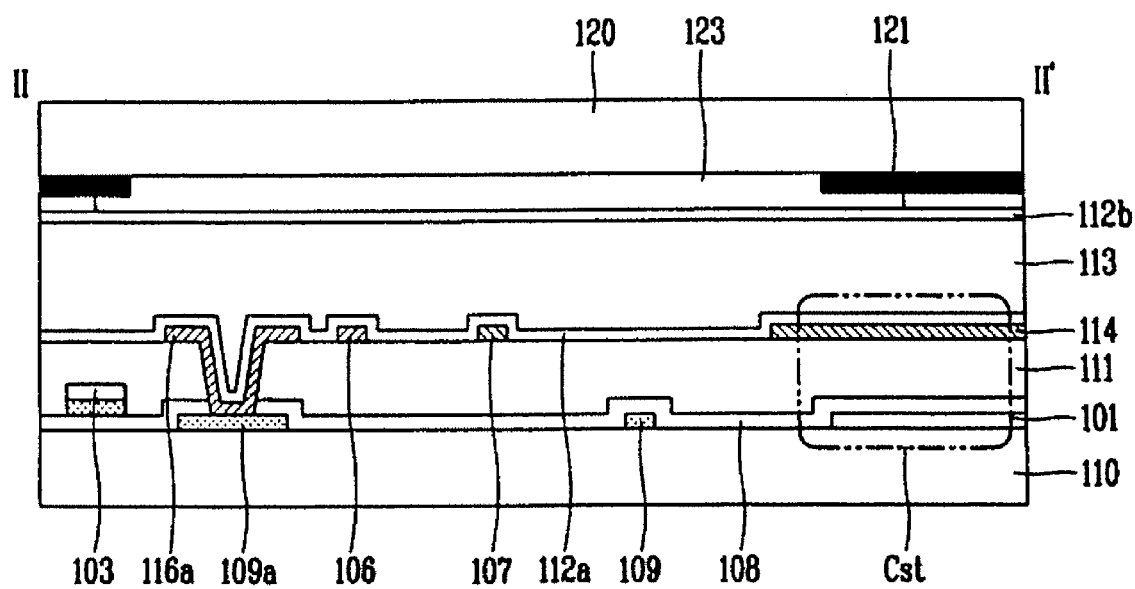
FIG. 2B is a cross-sectional view taken along line II-II' of FIG. 2A.

FIG. 2A is a plane view of an exemplary pixel region according to an embodiment of the present invention. FIG. 2B is a cross-sectional view taken along line II-II' of FIG. 2A. Referring to FIG. 2A, an IPS-LCD device 100 includes one or more gate line 101 arranged on a transparent first substrate 110 in a first direction and one or more data line 103 arranged in a second direction, and a pixel region (P) is defined a crossing of the one or more gate line 101 and the one or more data line 103. A switching device TFT is formed at the crossing of the gate line 101 and the data line 103. The switching device TFT can be a thin film transistor, which includes a gate electrode 101a, a semiconductor layer 105 formed on the gate electrode 101a, and source and drain electrodes 102a and 102b disposed on the semiconductor layer 105 and separated from each other at a predetermined interval.

At least one pair of common and pixel electrodes 106 and 107 are formed within the pixel region (P) to generate an in-plane electric field. The common electrode 106 and the pixel electrode 107 are disposed parallel to each other, and are inclined at an inclination angle (θ) with respect to the gate line

101. The inclination angle (θ) of the common electrode 106 and the pixel electrode 107 is in a range of 0<θ<45°.

Although not shown in the drawing, the gate line 101 may also be inclined to be parallel to the common electrode 106 and the pixel electrode 107. A rubbing direction (indicated as an arrow on the drawing) is perpendicular to the data line 103. The rubbing direction will be described in detail later.

First and second common lines 109a and 109b are formed parallel to the one or more data line 103 at left and right sides of the pixel region (P). The first common line 109a and the second common line 109b are electrically connected by a connection line 109. The connection line 109 functions as a common electrode within the pixel region (P). The connection line 109 performs a function of connecting the first common line 109a to the second common line 109b, and may be disposed at any location within the pixel region (P).

Figure 3:
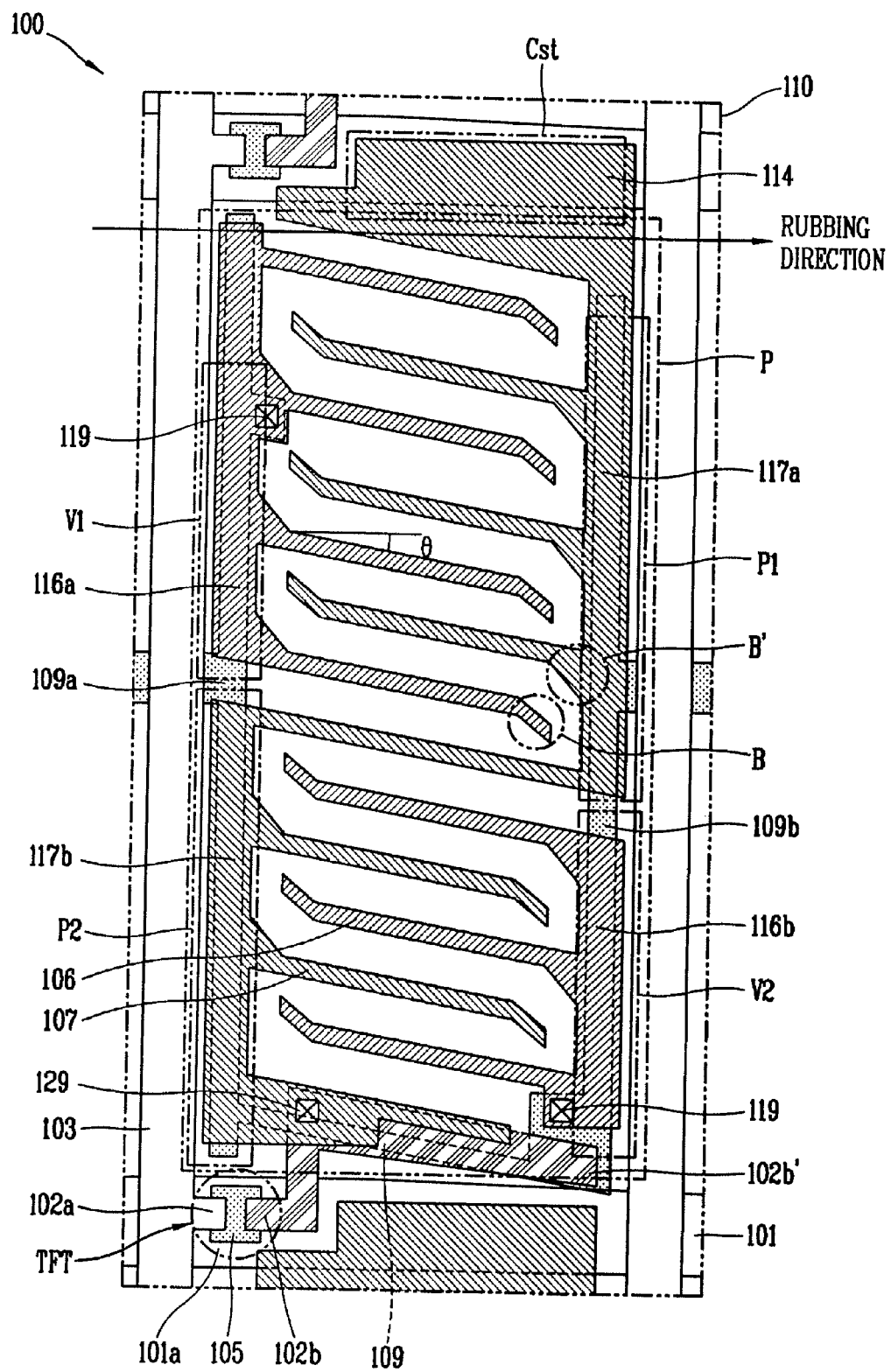
FIG. 3 is a plane view of an exemplary pixel region according to another embodiment of the present invention.

FIG. 3 is a plane view of an exemplary pixel region according to another embodiment of the present invention. Referring to FIG. 3, the connection line 109 may be formed at a lower portion of the pixel region (P). Because the LCD device shown in FIG. 3 has a similar structure as to the LCD device of FIG. 2A, the same reference numerals are used for same or like parts and the description thereof will be omitted. In each of the LCD devices of FIG. 2 and FIG. 3, the connection line 109 connecting the first common line 109a with the second common line 109b is located within the pixel region (P). The connection line 109 is disposed at an upper portion of the pixel region in FIG. 2A, while the connection line 109 is disposed at a lower portion of the pixel region of FIG. 3.

Referring back to FIG. 2A, the first and second common lines 109a and 109b supply a common signal to the common electrode 106 and effectively block a signal from the data line 103 to prevent the in-plane electric field from being distorted by interference with the data signal. Specifically, the data signal supplied to the data line 103 may affect the pixel electrode 107 adjacent to the data line 103, which may cause distortion of the electric field. However, the signal interference caused by the data line 103 can be reduced because the pixel electrode 107 has an inclination angle with respect to the data line 103. Accordingly, narrower widths of the first and second common lines 109a and 109b adjacent to the data line 103, compared to the related art, may be achieved, thus increasing the aperture ratio.

A common electrode 106 placed toward an upper side of the pixel region (P) has one side electrically connected to a first common electrode connection line 116a. The first common electrode connection line 116a overlaps the first common line 109a to form a first common electrode overlapping region (V1). Another common electrode 106 placed toward a lower side of the pixel region (P) has one side electrically connected to a second common electrode connection line 116b. The second common electrode connection line 116b overlaps a second common line 109b to form a second common electrode overlapping region (V2). The first common electrode overlapping region (V1) and the second common electrode overlapping region (V2) have the same area. Also, the first common electrode connection line 116a is electrically connected to the first common line 109a through a first contact hole 119 formed at the first overlapping region (V1), and the second common electrode connection line 116b is electrically connected to the second common line 109b through a second contact hole 119 formed at the second overlapping region (V2).

A pixel electrode 107 placed toward an upper side of the pixel region (P) has one side electrically connected to a first pixel electrode connection line 117a. The first pixel electrode connection line 117a overlaps the second common line 109b to form a first pixel electrode overlapping region (P1). Another pixel electrode 107 placed toward a lower side of the pixel region (P) has one side electrically connected to a second pixel electrode connection line 117b. The second pixel electrode connection line 117b overlaps the first common line 109b to form a second pixel electrode overlapping region (P2). The first pixel electrode overlapping region (P1) and the second pixel electrode overlapping region (P2) have the same area.

The overlapping regions between the common electrode connection line and the pixel electrode connection line, respectively, with the common lines at the right and left sides of the pixel are identically formed. Thus, the data line equally affects the right and left sides of the pixel. Specifically, if the data line were to differently affect the right and left sides of the pixel, image quality would be deteriorated by a difference in signal interference between the data line and the right and left sides. Accordingly, in an embodiment of the present invention, the overlapping regions between the common electrode connection line and the pixel electrode connection line, respectively, with the common lines at the right and left sides of the pixel region are identically formed, such that the data line equally affects the right and left sides of the pixel region to prevent the image quality degradation.

As shown in FIGS. 2A and 2B, a storage electrode 114 extending from the first pixel electrode connection line 117a has a first portion overlapping a front gate line 101 to form a storage capacitor (Cst). A second portion of the storage electrode 114 does not overlap the gate line 101 and expands into the pixel region (P) to function as a pixel electrode that generates an in-plane electric field within the pixel region together with the adjacent connection line 109. The second pixel electrode connection line 117b overlaps a pattern 102b' extending from the drain electrode 102b of the thin film transistor TFT and is electrically connected to the drain electrode 102b through a drain contact hole 129 formed at the overlapping region.

As shown in the FIG. 2B, the data line 103 is formed on a gate insulation film 108, and the common electrode 106 and the pixel electrode 107 are formed on a passivation film 111. Particularly, the common electrode 106 and the pixel electrode 107 are formed of a transparent conductive material such as ITO (indium tin oxide) or IZO (indium zinc oxide). As the common electrode 106 and the pixel electrode 107 are formed of the transparent conductive material, an aperture ratio may be improved in comparison with the related art. Namely, in the related art, the common electrode and the pixel electrode are formed of opaque metal, which results in reduction of an aperture ratio. However, the present invention may improve the aperture ratio because both the common electrode 106 and the pixel electrode 107 are made of a transparent conductive material.

Moreover, in embodiment of the present invention, because the common electrode 106 and the pixel electrode 107 are formed on the same plane, on the passivation film 111, a stronger electric field than that in the related art is generated and applied to a liquid crystal layer between the two electrodes. Such a strong electric field enables higher switching rate for the liquid crystal molecules within the liquid crystal layer, which facilitates moving image display.

The storage electrode 114 overlaps the gate line 101 with the gate insulation film 108 and the passivation film 111 therebetween to forming the storage capacitor (Cst). A black matrix 121 for preventing light leakage and a color filter 123 are formed on the second substrate 120. First and second alignment films 112a and 112b are applied on facing surfaces of the first and second substrates 110 and 120. The first and second alignment films 112a and 112b determine an initial alignment direction of a liquid crystal, and a liquid crystal layer 113 is formed therebetween. The alignment direction of the first alignment film 112a is perpendicular to the data line 103 and is inclined at a predetermined angle with respect to the directions of the common electrode 106 and the pixel electrode 107, such that light leakage at a region between the data line 103, and the first and second common lines 109a and 109b is prevented. Accordingly, an area occupied by the black matrix 121 may be reduced. This will now be described in more detail with reference to the drawings.

Figure 4A:
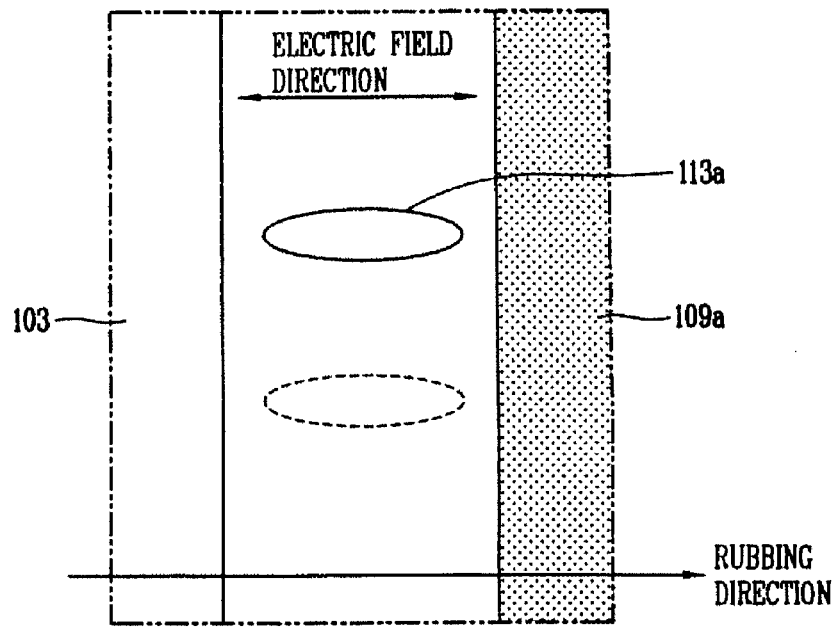
FIG. 4A is an enlarged view of a region between the data line and the first common line of FIG. 2A when a rubbing direction is perpendicular to a direction of the data line.
Figure 4B:
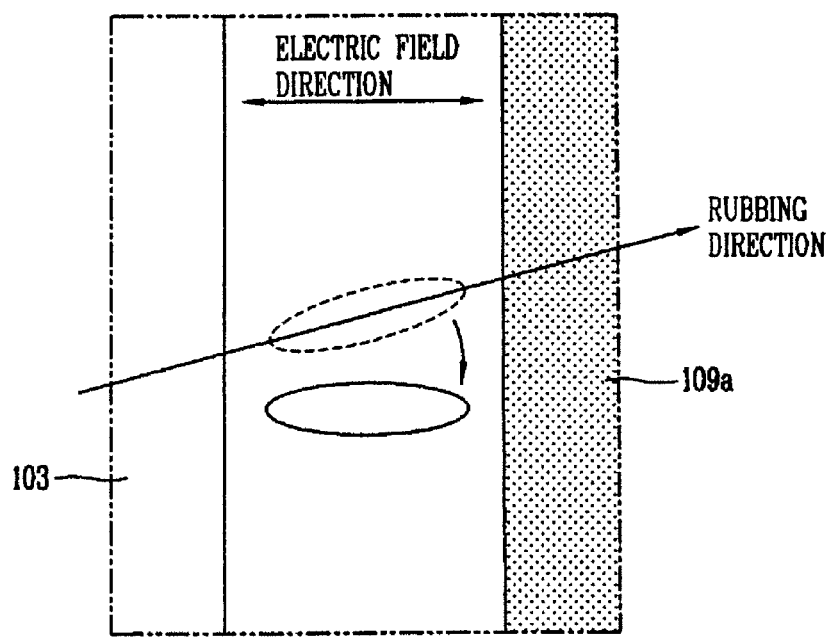
FIG. 4B is an enlarged view of a region between the data line and the first common line of FIG. 2A when a rubbing direction is not perpendicular to a direction of the data line.

FIG. 4A is an enlarged view of a region between the data line and the first common line of FIG. 2A when a rubbing direction is perpendicular to a direction of the data line. FIG. 4B is an enlarged view of a region between the data line and the first common line of FIG. 2A when a rubbing direction is not perpendicular to a direction of the data line. Here, the state of a liquid crystal molecule when a voltage is not applied is indicated by a dotted line, and the state of the liquid crystal molecule when driven by an applied a voltage is indicated by a solid line.

First, as shown in FIG. 4A, when the rubbing direction is perpendicular to the data line 103 and no voltage is applied, the liquid crystal molecule 113a is arranged in the rubbing direction of the alignment film and displays a black state when the rubbing direction is parallel to a lower polarization plate. When an applied voltage generates an electric field, the liquid crystal molecule 113a is driven according to the intensity of the applied voltage. Here, because a direction of the generated electric field between the data line 103 and the first common line 109a is the same as the rubbing direction when the voltage has been applied thereto, the liquid crystal molecule is substantially arranged parallel to the rubbing direction. Accordingly, in spite of the applied voltage, a screen displays black.

In contrast, as shown in FIG. 4B, when the rubbing direction is not perpendicular to the data line 103 and no voltage is applied, the liquid crystal molecule 113a is arranged along the rubbing direction and displays a black image. However, when a voltage is applied to the data line 103 and the first common line 109a, an electric field is generated between the data line 103 and the first common line 109a in a direction perpendicular to the data line 103. Thus, the liquid crystal molecule is driven along the direction of the electric field and transmits light. Furthermore, if the rubbing direction and the direction of the electric field form a 45° angle and the liquid crystal molecule is driven parallel to the direction of the electric field, a maximum transmittance may be obtained.

As shown in FIG. 4B, when the rubbing direction does not coincide with the direction of an electric field between the data line 103 and the first common line 109a, light leakage occurs at a region between the data line 103 and the first common line 109a. In order to prevent the light leakage, a black matrix 121 should be formed on the second substrate 120. When the black matrix 121 is formed on the second substrate 120, an alignment margin should be considered. Therefore, the black matrix 121 is formed wider than the actual light leakage region, thus decreasing the aperture ratio.

In contrast, as shown in FIG. 4A, because the rubbing direction is set to coincide with the direction of the electric field between the data line 103 and the first common line 109a, light leakage does not occur at the region between the data line 103 and the first common line 109a. Accordingly, the black matrix formed on the second substrate may have a minimum width without regard to an alignment margin for covering the region between the data line and the common line, thus increasing the aperture ratio.

In an embodiment of the present invention as illustrated in FIGS. 2A, 2B or FIGS. 3A, 3B, one portion of another side of the common electrode 106 which does not contact the first and second common electrode connection lines 116a and 116b, and one portion of another side of the pixel electrode 107 which does not contact the first and second pixel electrode connection lines 117a and 117b may be bent at a predetermined angle (shown in FIG. 2A). Also, as shown in FIG. 3, a portion (B') facing a bent portion (B) of the common electrode 106 or the pixel electrode 107 may also be inclined.

As shown in FIG. 2A, if one side of each of the common electrode 106 and the pixel electrode 107 is simply bent, the first and second common lines 109a and 109b are formed to be wider than the common electrode connection lines 116a and 116b and the pixel electrode connection lines 117a and 117b. Also, widths of the first and second common lines 109a and 109b may be 8 μm or smaller. In contrast, as shown in FIG. 3, if an inclined surface (B') is formed at a surface facing a bent portion (B), the first and second common lines 109a and 109b are formed to be narrower than the common electrode connection lines 116a and 116b and the pixel electrode connection lines 117a and 117b.

By bending one portion of the electrodes or inclining a portion (B') facing a bent portion (B), electric field distortion occurring at an outer edge of the pixel region, namely, at both sides of a common electrode 106 and a pixel electrode 107 is minimized in an in-plane electric field forming region between the two electrodes 106 and 107. Specifically, an electric field formed at both sides of the common electrode 106 and the pixel electrode 107 may be distorted because these two electrodes are not disposed as parallel to each other as they are in the center portion of the pixel. Such a distortion in the electric field can cause an abnormal arrangement of the liquid crystal molecules. Thus, to place the two electrodes generating an in-plane electric field in this region as parallel as possible, one portion of the pixel electrode 107 or the common electrode 109 is bent or an inclined surface (B') is formed at a region forming an electric field, corresponding to a bent portion (B).

Figure 5:
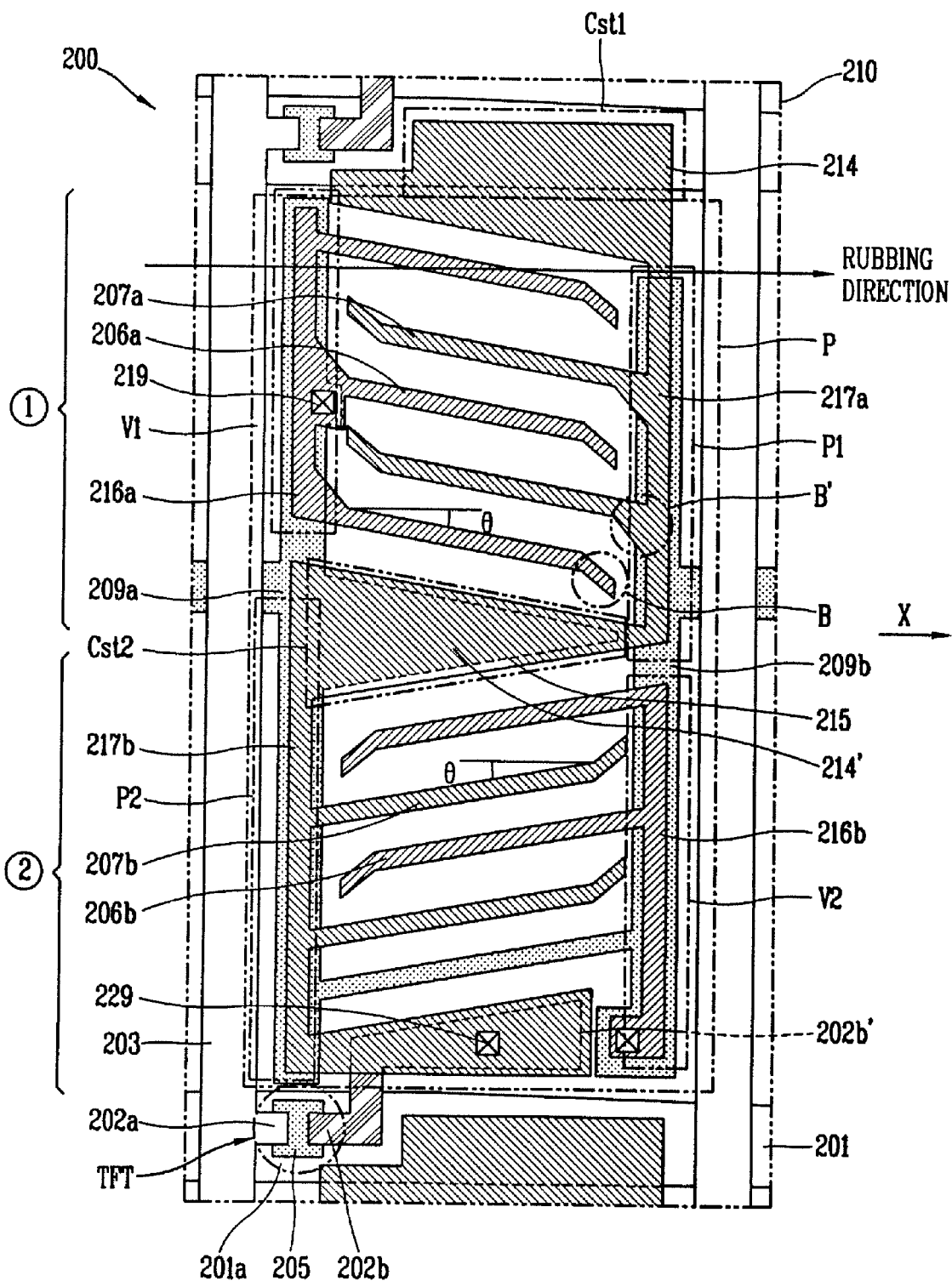
FIG. 5 is a plane view of an exemplary pixel region according to another embodiment of the present invention.

FIG. 5 is a plane view of an exemplary pixel region according to another embodiment of the present invention. In accordance with this embodiment of the present invention, a two-domain structure is formed. In the two-domain structure, a direction in which a liquid crystal is driven is symmetrical, such that a color shift phenomenon may be minimized by offsetting abnormal light due to a birefringence characteristic of the liquid crystal. Also, the structure of FIG. 5 is substantially similar to FIGS. 2A and 3, except for symmetrical disposition of a common electrode and a pixel electrode at upper and lower sides of the pixel region.

As shown in FIG. 5, an IPS-LCD device 200 includes a gate line 201 arranged on a transparent first substrate 210 in a first direction and a data line 203 arranged in a second direction. A crossing of the gate line 201 and the data line 203 defines a pixel region (P). First and second common lines 209a and 209b are disposed parallel to the data line 203 at an outer edge of the pixel region (P). An x-axis perpendicular to the data line 203 and passing through a center of the pixel region defines first pixel region (①) above the x-axis and a second pixel region (②) below the x-axis.

At least one pair of a first common electrode 206a and a first pixel electrode 207a generating an in-plane electric field are formed in first pixel region (①). The first common electrode 206a and the first pixel electrode 207a are inclined at an inclination angle (θ) with respect to the gate line 201. The inclination angle (θ) is within a range of 0<θ<45°. The gate line 201 may be inclined to be parallel to the first common electrode 206a and the first pixel electrode 207a. Also, a first common line 209a electrically connected to one side of the first common electrode 206a and forming a first common electrode overlapping region (V1) together with the first common line 209a is formed on the first common electrode 206a of the first pixel region (①). A first pixel electrode connection line 217a electrically connected to one side of the first pixel electrode 207a and forming a first pixel electrode overlapping region (P1) together with the first common line 209a are formed on the second common electrode 206b. Also, widths of the first and second common lines 209a, 209b may be 8 μm or smaller.

At least one pair of a second common electrode 206b and a second pixel electrode 207b generating an in-plane electric field are formed at the second pixel region (②). The second common electrode 206b and the second pixel electrode 207b are symmetrical to the first common electrode 206a and the first pixel electrode 207a disposed at the first pixel region (①) on the basis of the x-axis. Namely, the second common electrode 206b and the second pixel electrode 207b are inclined at an inclination angle (θ) with respect to the x-axis, and the inclination angle (θ) is the same as that of the first common electrode 206a and the first pixel electrode 207a.

Also, a second common electrode connection line 216b electrically connected to one side of the second common electrode 206b and forming a second common electrode overlapping region (V2) together with the first common line 209a are formed on the first common electrode 206a of the second pixel region (②). A second pixel electrode connection line 217b electrically connected to one side of the second pixel electrode 207b and forming a second pixel electrode overlapping region (P2) together with the first common line 209a is formed on the second common electrode 206b. The first common electrode overlapping region (V1) of the first pixel region (①) and the second common electrode overlapping region (V2) of the second pixel region (②) have the same area, and the first pixel electrode overlapping region (P1) of the first pixel region (①) and the second pixel electrode overlapping region (P2) of the second pixel region (②) have the same area.

By bending portions of the common electrodes 206a and 206b and the pixel electrodes 207a and 207b, the image quality may be improved. An inclined surface (B') may be made at a surface facing a bent portion (B) of the electrode. Here, when the inclined surface (B') is formed at the surface facing the bent portion (B), the common lines 209a and 209b should be wider than the common electrode connection lines 216a and 216b and the pixel electrode connection lines 217a and 217b.

As described above, in an embodiment of the present invention, the disposition of the first common electrode 206a and the first pixel electrode 207a formed at the first pixel region (①) is symmetrical to that of the second common electrode 206b and the second pixel electrode 207b formed at the second pixel region (②) to form a two-domain structure. Accordingly, liquid crystal molecules of the first pixel region (①) and the second pixel region (②) are arranged symmetrically.

A first storage electrode 214 extending from the first pixel electrode connection line 217a forms a first storage capacitor (Cst1) by overlapping a front gate line 201. An extending pattern 215 protruding into the pixel region from the first common line 209a forms a second storage capacitor (Cst2) at a boundary surface between the first pixel region (①) and the second pixel region (②) together with a second storage electrode 214' protruding from the pixel electrode connection line and overlapping the extending pattern 215. Accordingly, compared to the previous embodiments in FIGS. 2A and 3, the second storage capacitor (Cst2) is increased.

The storage capacitor Cst2 charges a gate voltage while a gate signal is applied to the gate electrode. Then, the charged voltage is maintained while a data voltage is applied to the pixel electrode when the next gate line is driven, thereby preventing a voltage fluctuation of the pixel electrode. Thus, if the storage capacitor Cst2 is increased, flicker due to the voltage fluctuation of the pixel electrode may be effectively prevented.

Figure 6:
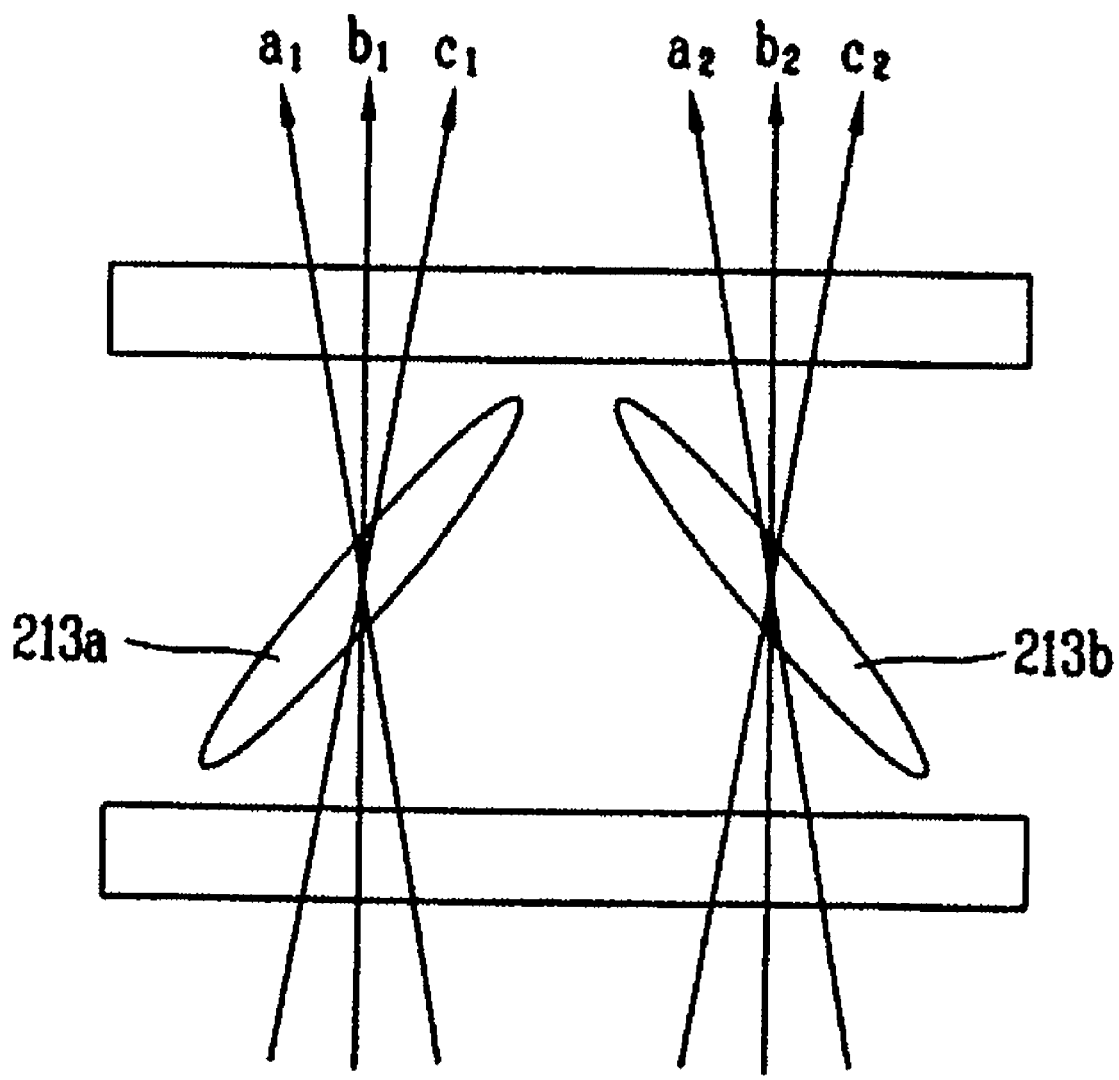
FIG. 6 is a view for explaining compensation for a viewing angle in accordance with an embodiment of the present invention.

FIG. 6 is a view for explaining compensation for a viewing angle in accordance with an embodiment of the present invention. As shown in FIG. 6, with the two-domain structure in which liquid crystal molecules are arranged symmetrically, a birefringence value of a1 of a first liquid crystal molecule 213a is compensated by a birefringence value of a2 of a second liquid crystal molecule 213b arranged in a direction opposite to that of the first liquid crystal molecule 213a, so that the birefringence value becomes about zero. Also, a birefringence value of c1 is compensated by c2. Accordingly, the color shift phenomenon due to the birefringence characteristic of the liquid crystal is minimized, thereby preventing deterioration of the image quality according to a viewing angle.

As described above, in the IPS-LCD device in accordance with an embodiment of the present invention, a common electrode and a pixel electrode are formed of a transparent material, an area occupied by a black matrix may be minimized, and widths of the first and second common lines disposed at an outer edge of the pixel may be minimized, thus improving the aperture ratio. Furthermore, right and left regions where the common electrode connection line and the pixel electrode connection line overlap the common lines disposed at both sides of the pixel region are formed identically, such that the data line equally affects right and left sides of the pixel and accordingly, the image quality is improved. Because of the equal influence of the data line on the right and left sides of the pixel, image deterioration can also be prevented. Furthermore, in an embodiment of the present invention, a two-domain structure is provided in which a common electrode and a pixel electrode within one pixel are symmetrical with respect to an x-axis, thereby improving a viewing angle characteristic. Although not shown in the drawing, two pixels may formed a two-domain structure.

Figure 7A:
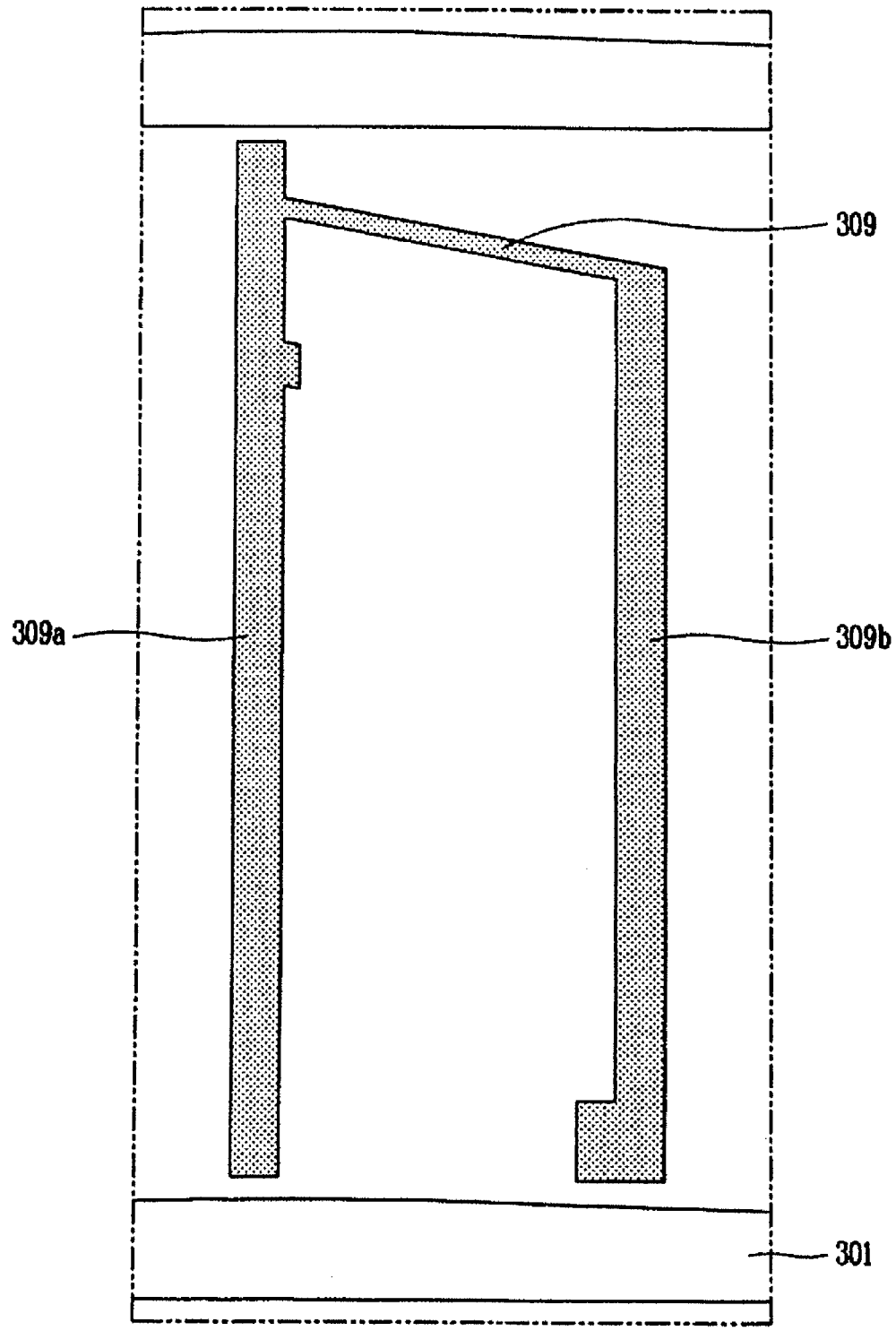
FIGS. 7A to 7D are plan views which illustrate an exemplary process for fabricating the IPS-LCD device in accordance with an embodiment of the present invention.
Figure 7B:
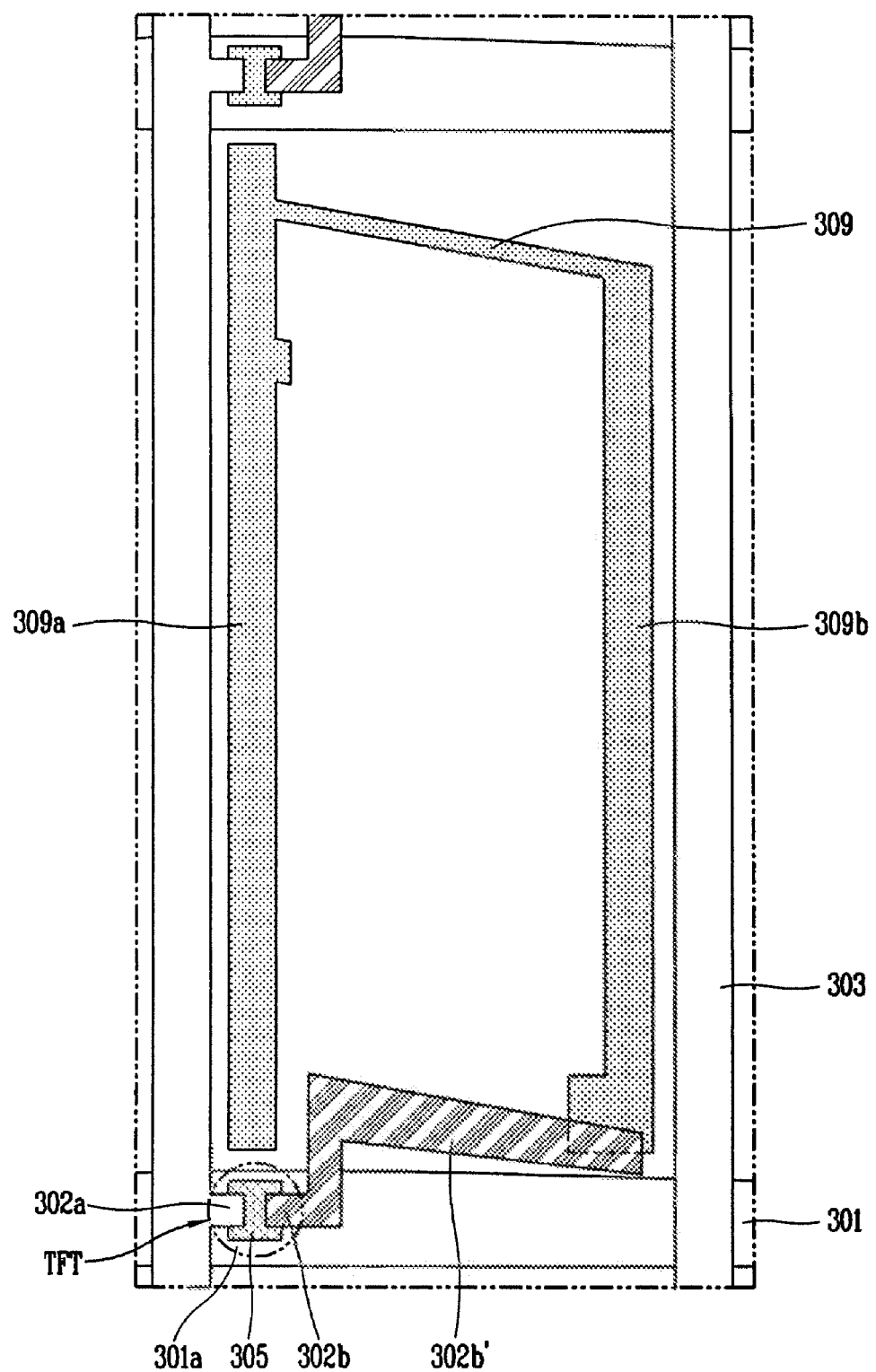
Figure 7C:
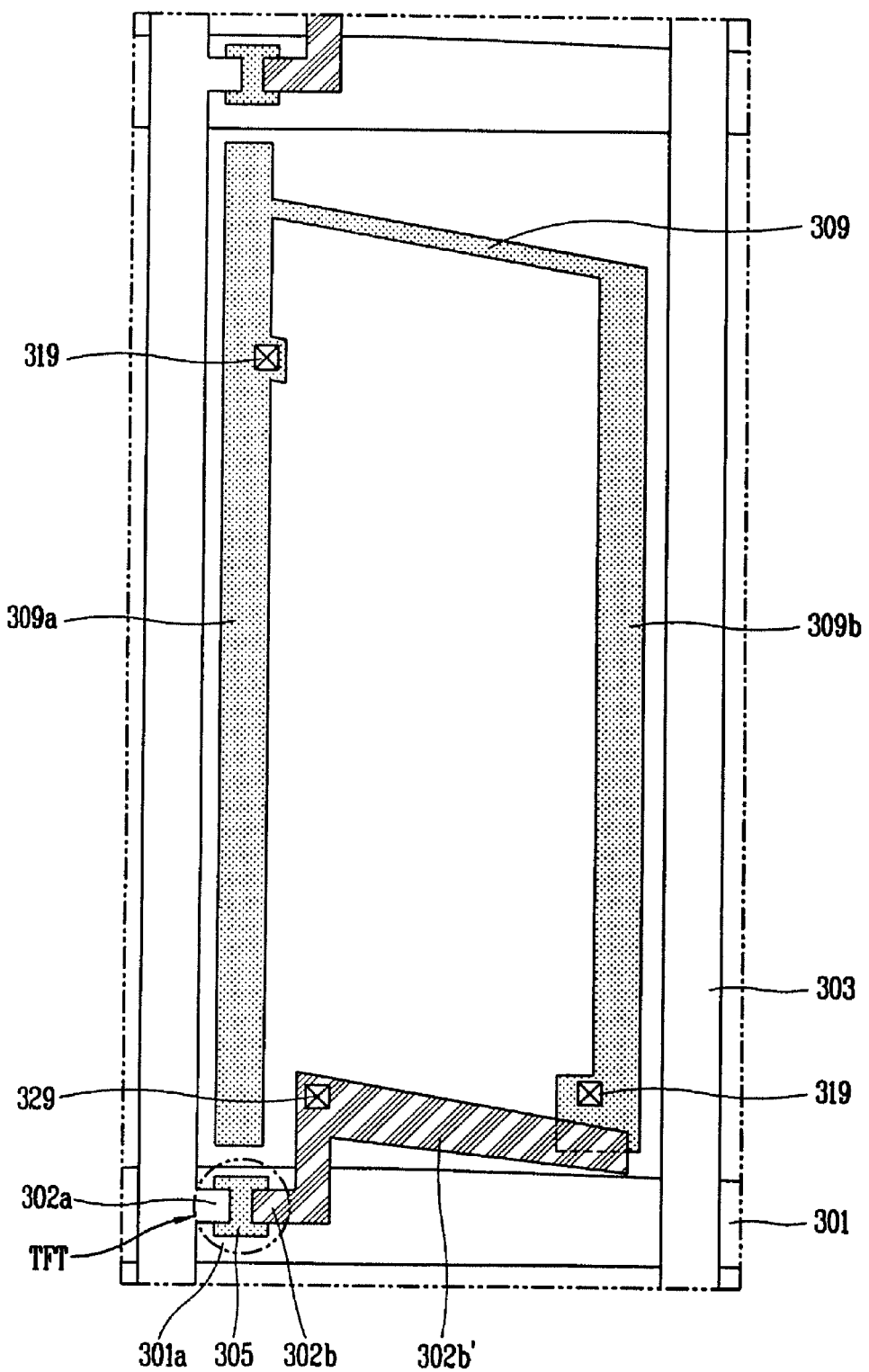
Figure 7D:
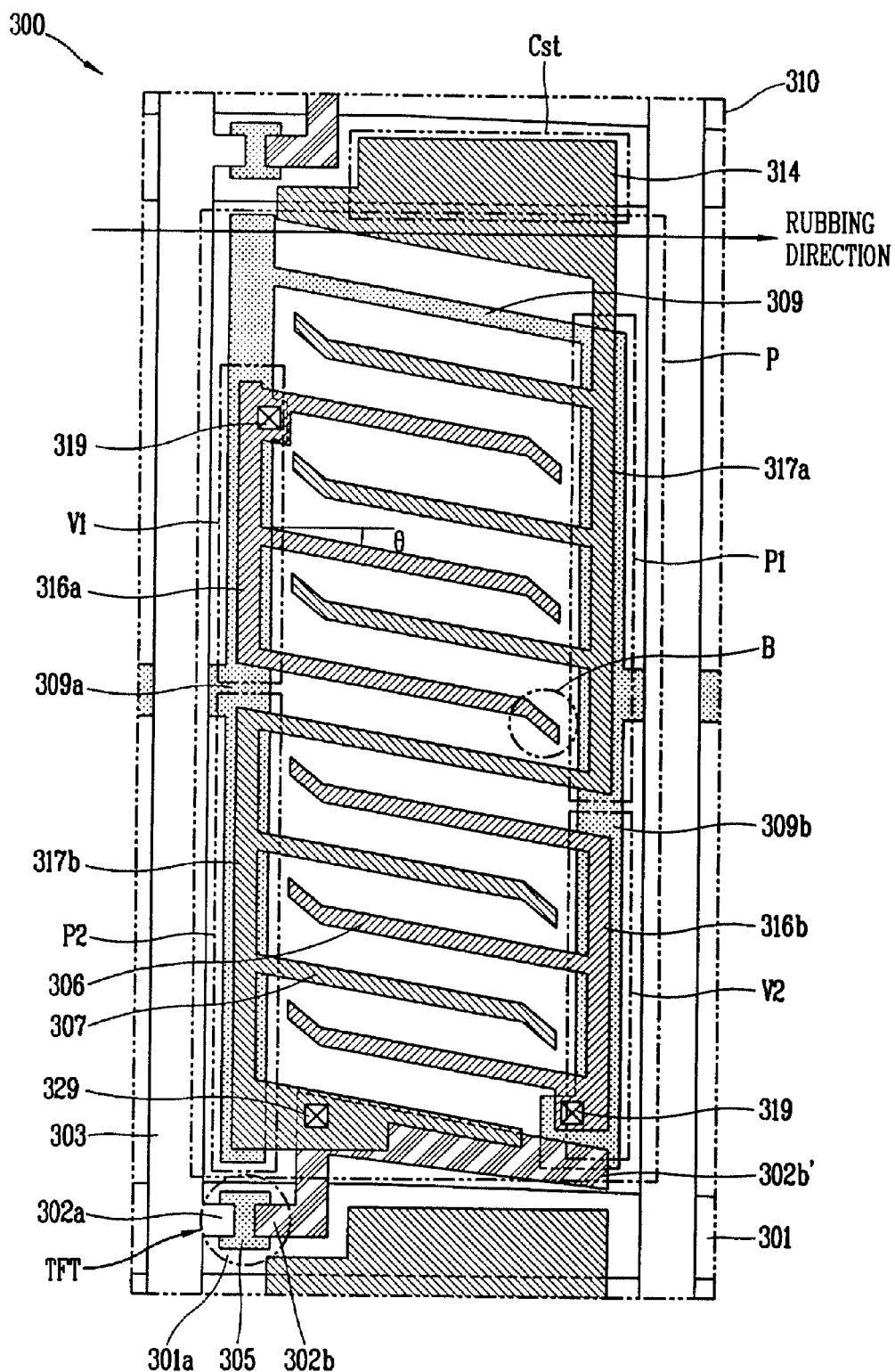
Figure 8A:
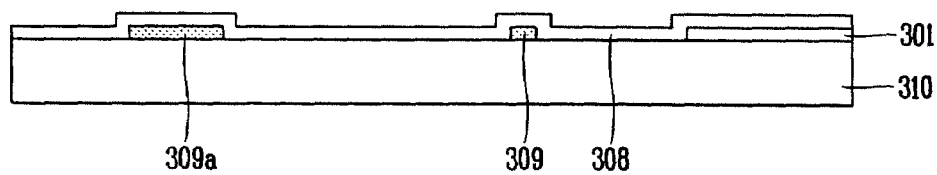
FIGS. 8A to 8D are cross sectional views which illustrate an exemplary process for fabricating the IPS-LCD device in accordance with an embodiment of the present invention.

FIGS. 7A to 7D are plan views which illustrate an exemplary process for fabricating the IPS-LCD device in accordance with an embodiment of the present invention; and FIGS. 8A to 8D are cross sectional views which illustrate an exemplary process for fabricating the IPS-LCD device in accordance with an embodiment of the present invention. First, as shown in FIGS. 7A and 8A, a transparent first substrate 310 is provided, then a first metal material, such as Cu, Ti, Cr, Al, Mo, Ta or Al alloy, is deposited thereon and is patterned to form a gate line 301, a gate electrode 301a, first and second common lines 309a and 309b disposed perpendicular to the gate line 301, and a connection line 309 electrically connecting the first common line 309a with the second common line 309b. Then, SiNx, SiOx, or the like is deposited on an entire surface of the substrate including the gate line 301 and the common lines 309a, 309b by a plasma CVD method to form a gate insulation film 308.

Figure 8B:
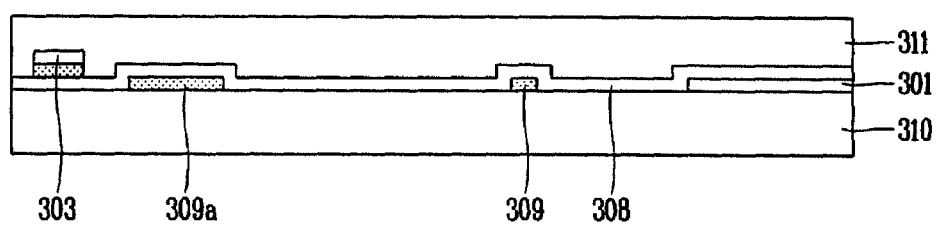

As shown in FIGS. 7B and 8B, an amorphous silicon and n+ amorphous silicon is stacked on the gate insulation film 308, and then a second metal material such as Cu, Mo.Ta, Al, Cr, Ti, or Al alloy is deposited thereon and is patterned to form a semiconductor layer 305 on the gate electrode 301a, a data line 303 disposed perpendicular to the gate line 301 and defining a pixel region together with the gate line 301, and source/drain electrodes 302a/302b separated at a predetermined interval on the semiconductor layer 305 to form a thin film transistor TFT. An extending pattern 302b' of the drain electrode 302b is also formed. Then, an inorganic substance, such as SiNx, SiOx, or the like, or an organic substance, such as benzocyclobutene, acryl, or the like, is applied on the substrate 310, including the thin film transistor TFT, to form a passivation film 311.

Figure 8C:
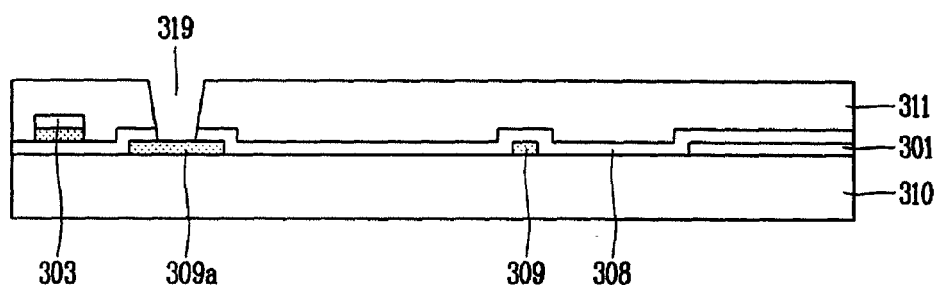

Then, as shown in FIGS. 7C and 8C, a first contact hole 319 exposing the first and second common lines 309a and 309b, and a second contact hole 329 exposing the extending pattern 302b' of the drain electrode 302b are formed at selected portions of the passivation film 311 and the gate insulation film 308.

Figure 8D:
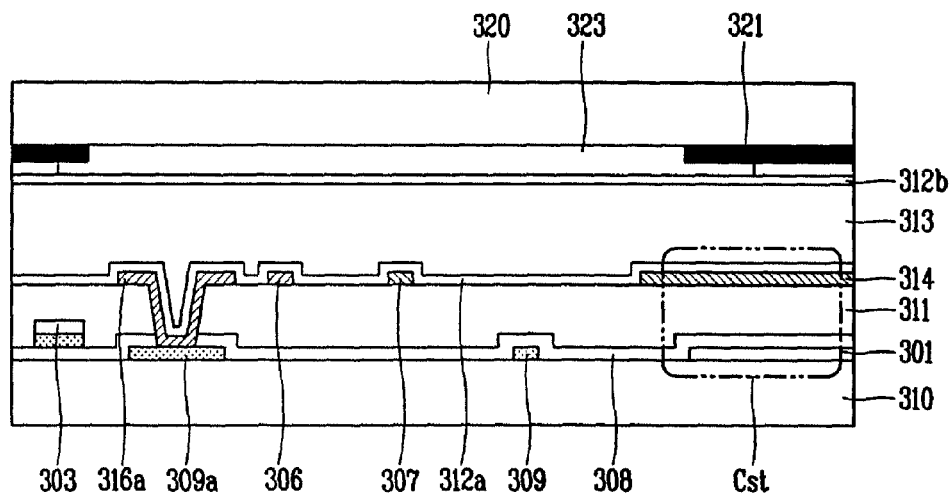

Then, as shown in FIGS. 7D and 8D, a transparent conductive material, such as ITO (indium tin oxide) or IZO (indium zinc oxide) is deposited on the passivation film 311 including the first and second contact holes 319 and 329, and is patterned to form common electrodes 306 and pixel electrodes 307 inclined with respect to the gate line 201 and for generating an in-plane electric field within the pixel region. Here, a first common electrode connection line 316a and a second common electrode connection line 316b are also formed. The first common electrode connection line 316a is electrically connected to one side of a common electrode 306 in an upper part of the pixel region. The first common electrode connection line 316a overlaps a first common line 309a to form a first common electrode overlapping region (V1). The second common electrode connection line 316b is electrically connected to one side of another common electrode 306 in a lower part of the pixel region. The second common electrode connection line 316b overlaps a second common line 309b to form a second common electrode overlapping region (V2).

A first pixel electrode connection line 317a and a second pixel electrode connection line 317b are also formed. The first pixel electrode connection line 317a is electrically connected to one side of a pixel electrode 307 at an upper part of the pixel region. The first pixel electrode connection line 317a overlaps the first common line 309a to form a first pixel electrode overlapping region (P1). The second pixel electrode connection line 317b is electrically connected to one side of another pixel electrode 307 at a lower part of the pixel region. The second pixel electrode connection line 317b overlaps the second common line 309b to form a second pixel electrode overlapping region (P2).

A storage electrode 314 extending from the first pixel electrode connection line 317a and forming a storage capacitor (Cst) by overlapping a front gate line 301 is also formed. Portions of the pixel electrode 307 and the common electrode 306 may have a bent structure, and although not shown in the drawing, an inclined surface may be formed at a region facing a bent portion (B). Then, a first alignment film 312a is formed on the first substrate 310. Then, an IPS-LCD device is fabricated by attaching the first substrate 310 to a second substrate 320, on which a black matrix 321, a color filter 323, and a second alignment film 312b are formed.

As described above, in an embodiment of the present invention, an IPS-LCD device has a high aperture ratio. Particularly, the aperture ratio is improved by forming a common electrode and a pixel electrode of a transparent conductive material. Also, The width of a common line that is adjacent to a data line is reduced. Signal interference by the data line is prevented because a common electrode and a pixel electrode generating an in-plane electric field are formed in a horizontal direction and are inclined with respect to a gate line. In addition, the width of a black matrix for covering a region between a data line and a common line adjacent to the data line may be minimized because a rubbing direction is perpendicular to the data line and thus, light leakage is prevented at the region. Also, image quality is improved by minimizing electric field distortion because one portion of a common electrode or a pixel electrode is bent or a portion facing a bent portion of the electrode is inclined.

It will be apparent to those skilled in the art that various modifications and variations can be made in the in-plane switching mode liquid crystal display device and the method for fabricating the same of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:
   a first substrate;
   a gate line disposed in a first direction on the first substrate;
   a data line disposed in a second direction on the first substrate, the data line crossing the gate line to define a pixel region, including a first pixel region and a second pixel region;
   one or more first pixel electrode and one or more first common electrode inclined with respect to the first direction and generating a first in-plane electric field within the first region;
   one or more second pixel electrode and one or more second common electrode inclined with respect to the first direction and generating a second in-plane electric field within the second region symmetrically to the first in-plane electric field with respect to the first direction;
   first and second common lines parallel to the data line at left and right sides of the pixel region, respectively;
   a first common electrode connection line overlapping the first common line of the first region and connecting at least two first common electrodes;
   a second common electrode connection line overlapping the second common line of the second region and connecting at least two second common electrodes;
   a first pixel electrode connection line overlapping the second common line of the first region and connecting at least two first pixel electrodes;
   a second pixel electrode connection line overlapping the first common line of the second region and connecting at least two second pixel electrodes; and
   an extending pattern protruding into the pixel region from the first common line and forming a storage capacitor at a boundary surface between the first pixel region and the second pixel region together with a storage electrode protruding from the first pixel electrode connection line and overlapping the extending pattern,
   wherein a first common electrode overlapping region of the first common line and the first common electrode connection line and a second common electrode overlapping region of the second common line and the second common electrode connection line have the same area, and a first pixel electrode overlapping region of the second common line and the first pixel electrode connection line and a second pixel electrode overlapping region of the first common line and the second pixel electrode connection line have the same area.

2. The device of claim 1, wherein one side of at least one of the first common electrode and the first pixel electrode is bent.

3. The device of claim 1, wherein one side of at least one of the second common electrode and the second pixel electrode is bent.

4. The device of claim 3, wherein the first and second common lines are wider than the first and second common electrode connection lines and the first and second pixel electrode connection lines.

5. The device of claim 4, wherein a region facing the bent side is inclined.

6. The device of claim 1, wherein the first and second common lines are wider than the first and second common electrode connection lines and the first and second pixel electrode connection lines.

7. The device of claim 1, wherein the first and second common electrodes and the first and second pixel electrodes are formed of a transparent conductive material.

8. The device of claim 7, wherein the transparent conductive material is one of indium tin oxide (ITO) and IZO (indium zinc oxide).

9. The device of claim 1, wherein a contact hole electrically connects the first and second common lines with the first and second common electrode connection lines.

10. The device of claim 1, wherein a rubbing direction of the first substrate is parallel to the first direction.

11. The device of claim 1, further comprising a connection line electrically connecting the first common line with the second common line.

12. The device of claim 11, wherein the connection line is placed at the first region.

13. The device of claim 11, wherein the connection line is placed at the second region.

14. The device of claim 1, further comprising a storage electrode extending from the first pixel electrode connection line and forming a storage capacitor by overlapping a front gate line.

15. The device of claim 1, wherein the first and second common lines are 8 μm or smaller.

16. The device of claim 1, further comprising a second substrate and
a liquid crystal layer formed between the first substrate and the second substrate,
wherein the second substrate comprises a black matrix and a color filter, and the black matrix has a minimum width regardless of an alignment margin for covering a region between the data line and the common line.

17. An in-plane switching mode liquid crystal display device comprising:
a first substrate;
a gate line disposed in a first direction on the first substrate;
a data line disposed in a second direction on the first substrate, the data line crossing the gate line to define a pixel region;
pixel electrodes and common electrodes disposed in the first direction in the pixel region, the pixel electrodes and the common electrodes generating an in-plane electric field within the pixel region;
first common line disposed parallel to the data line at left side of the pixel region;
a second common line disposed parallel to the data line at right side of the pixel region;
a first common electrode connection line connecting at least two common electrodes and forming a first common electrode overlapping region by overlapping the first common line;
a second common electrode connection line connecting at least two other common electrodes and forming a second common electrode overlapping region by overlapping the second common line;
a first pixel electrode connection line connecting at least two pixel electrodes and forming a first pixel electrode overlapping region by overlapping the first common line;
a second pixel electrode connection line connecting at least two second pixel electrodes and forming a second pixel overlapping region by overlapping the second common line; and
an extending pattern protruding into the pixel region from the first common line and forming a storage capacitor at a boundary surface between the first pixel region and the second pixel region together with a storage electrode protruding from the first pixel electrode connection line and overlapping the extending pattern,
wherein a first common electrode overlapping region and the second common electrode overlapping region have substantially the same area, and the first pixel electrode overlapping region and the second pixel electrode overlapping region have substantially the same area,
wherein the first common electrode overlapping region is formed at the different area from that of the first pixel electrode overlapping region, and wherein the second common electrode overlapping region is formed at the different area from that of the second pixel electrode overlapping region,
wherein one side of at least one of the common electrodes and the pixel electrodes is bent, and a region facing the bent side is inclined,
wherein the first and second common lines are narrower than the common electrode connection line and the pixel electrode connection line.

18. The device of claim 17, wherein the common electrodes and the pixel electrodes are inclined with respect to of the first direction.

19. The device of claim 18, wherein the common electrodes and the pixel electrodes have an inclination of about 45° or less with regard to the first direction.

20. The device of claim 17, wherein the common electrodes and the pixel electrodes are formed on the same plane.

21. The device of claim 17, wherein a contact hole electrically connecting the first common line with the first common electrode connection line and electrically connecting the second common line with the second common electrode connection line is formed.

22. The device of claim 17, further comprising a second substrate and a liquid crystal layer formed between the first substrate and the second substrate, wherein the second substrate comprises a black matrix and a color filter,
wherein a rubbing direction of the first substrate is parallel to the first direction and thereby the black matrix has a minimum width regardless of an alignment margin for covering a region between the data line and the common line.

23. The device of claim 17, further comprising a connection line electrically connecting the first and second common lines.

24. The device of claim 23, wherein the connection line is placed at an upper portion of the pixel region.

25. The device of claim 23, wherein the connection line is placed at a lower portion of the pixel region.

26. The device of claim 17, further comprising a storage electrode extending from the pixel connection line and forming a storage capacitor by overlapping a front gate line.

27. The device of claim 17, wherein widths of the first and second common lines are 8 μm or smaller.

* * * * *